(12) United States Patent  
Groulx et al.

(10) Patent No.: US 8,465,225 B2  
(45) Date of Patent: Jun. 18, 2013

(54) ASPHALT RECYCLER AND HEAT MANAGEMENT APPARATUS

(75) Inventors: Michael J. Groulx, Midland, MI (US); Thomas K. Klumpp, Midland, MI (US)

(73) Assignee: Falcon Road Maintenance Equipment, Midland, MI (US)

( * ) Notice: Subject to any disclaimer, the term of this patent is extended or adjusted under 35 U.S.C. 154(b) by 59 days.

(21) Appl. No.: 13/235,756

(22) Filed: Sep. 19, 2011

(65) Prior Publication Data

US 2013/0071184 A1 Mar. 21, 2013

(51) Int. Cl.
*E01C 23/14* (2006.01)

(52) U.S. Cl.
USPC .............................. 404/95; 404/110; 298/1 H

(58) Field of Classification Search
USPC .............................. 404/95, 110, 108; 298/1 H
See application file for complete search history.

(56) References Cited

U.S. PATENT DOCUMENTS

| | | | |
|---|---|---|---|
| 2,496,113 A | 1/1950 | Wollner | |
| 3,386,435 A | 6/1968 | Heller (Reexam) | |
| 3,577,976 A | 5/1971 | Heller | |
| 3,633,563 A | 1/1972 | Osborn et al. | |
| 3,721,226 A | 3/1973 | Childree et al. | |
| 4,387,996 A | 6/1983 | Mendenhall | |
| 4,418,682 A | 12/1983 | Heller | |
| 4,445,848 A | 5/1984 | Heller | |
| 4,453,856 A * | 6/1984 | Chiostri et al. | 404/91 |
| 4,540,287 A | 9/1985 | Servas et al. | |
| 4,705,404 A | 11/1987 | Brüggemann | |
| 4,812,076 A * | 3/1989 | Yant | 404/108 |
| 4,868,999 A | 9/1989 | Radomsky | |
| 5,120,217 A | 6/1992 | O'Brien et al. | |
| 5,322,367 A | 6/1994 | Nath et al. | |
| 5,335,989 A | 8/1994 | Tanaka | |
| 6,109,826 A * | 8/2000 | Mertes | 404/95 |
| 6,681,761 B2 | 1/2004 | Dillingham | |
| 7,150,420 B2 | 12/2006 | Packer et al. | |
| 7,240,866 B2 | 7/2007 | Packer et al. | |
| 7,300,225 B2 * | 11/2007 | Musil | 404/79 |
| 7,384,181 B1 | 6/2008 | Collette | |

* cited by examiner

*Primary Examiner* — Gary Hartmann
(74) *Attorney, Agent, or Firm* — Price Heneveld LLP

(57) ABSTRACT

The present invention generally relates to a portable asphalt recycling and asphalt heat management apparatus comprising a seamless vacuum-formed one-piece combustion chamber that defines a fuel incubator disposed therein. A heat accumulator is operably coupled to the combustion chamber and a hopper assembly is operably coupled to the heat accumulator. The apparatus further comprises a heat distribution system in communication with the heat accumulator and the hopper assembly to provide heat the to the hopper assembly for recycling used asphalt or for maintaining a mixture of asphalt for use in asphalt repairs.

18 Claims, 8 Drawing Sheets

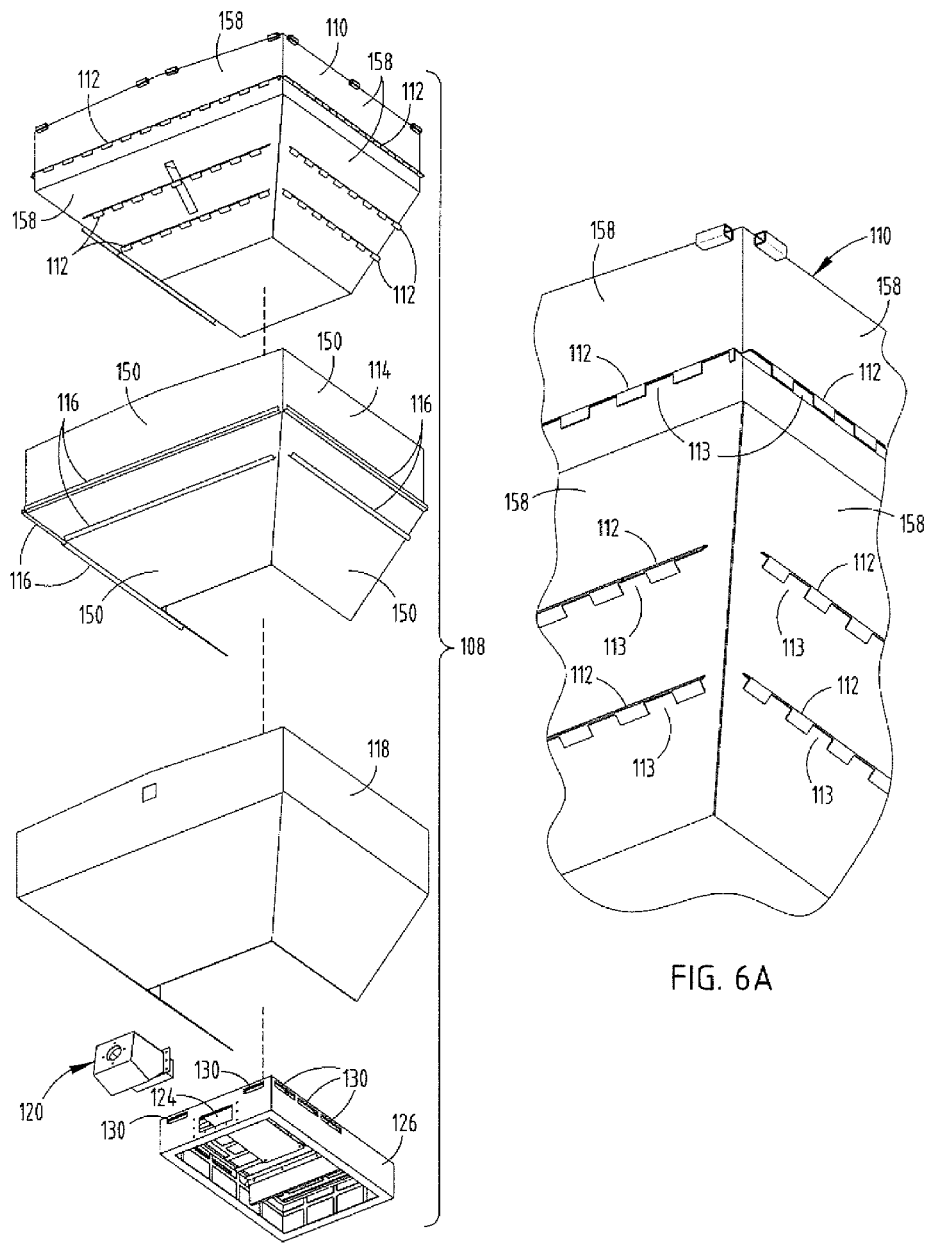

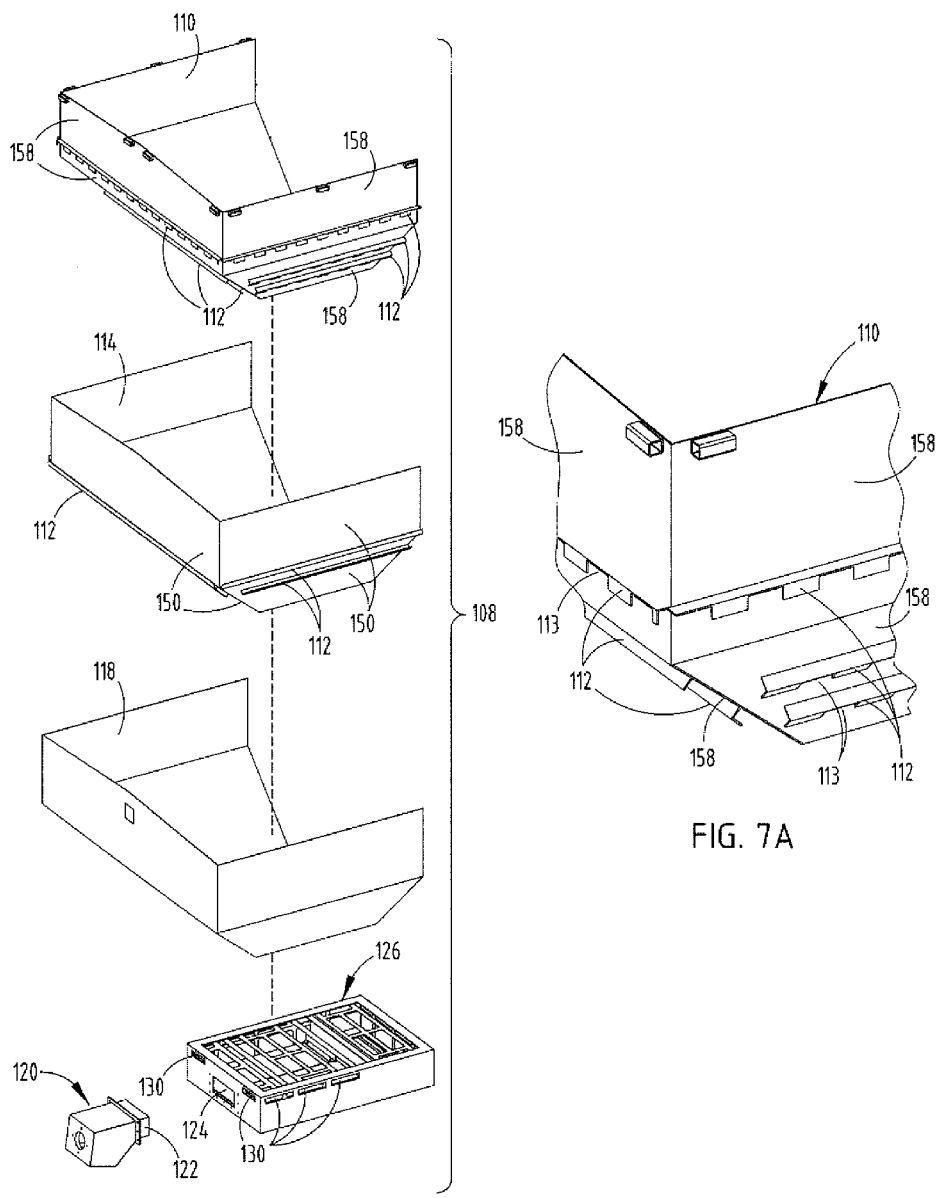

US 8,465,225 B2

ASPHALT RECYCLER AND HEAT MANAGEMENT APPARATUS

FIELD OF THE INVENTION

The present invention relates to a portable asphalt recycling, asphalt management apparatus and hauler having a high efficiency combustion chamber for recycling asphalt and for managing an asphalt mixture for on-site asphalt repairs.

BACKGROUND OF THE INVENTION

In repairing asphalt on a job site, often times, a cold asphalt mixture is used to repair damaged asphalt or to fill-in asphalt that has been removed. This cold asphalt mixture is generally used when large-scale hot asphalt mixtures are not warranted or available. However, the cold asphalt mixture generally cannot provide the variability, ease of installation, and patch durability that a hot asphalt mixture can provide.

Thus, a need exists for a portable asphalt recycling and asphalt management apparatus that allows for on-site recycling and heat management of a hot asphalt mixture for asphalt repair.

SUMMARY OF THE INVENTION

One aspect of the present invention includes a portable asphalt recycling and asphalt heat management apparatus comprising a seamless vacuum-formed one-piece combustion chamber that defines a fuel incubator disposed therein. A heat accumulator is operably coupled to the combustion chamber and a hopper assembly is operably coupled to the heat accumulator. The apparatus further comprises a heat distribution system in communication with the heat accumulator and the hopper assembly to provide heat to the hopper assembly for recycling used asphalt or for maintaining a hot mixture of asphalt for use in asphalt repairs.

Another aspect of the present invention includes a portable asphalt recycling and asphalt heat management system comprising a combustion chamber having a fuel incubator disposed therein, wherein the combustion chamber radiates heat. An insulated vented heat chamber or heat accumulator is operably coupled to the combustion chamber to collect heat that radiates from the combustion chamber. An insulated hopper assembly is operably coupled to the heat chamber, and a heat distribution system is disposed within the heat chamber and hopper assembly to distribute heat in a controlled manner for recycling asphalt.

Yet another aspect of the present invention includes a combustion chamber for use in an asphalt recycling and heat management system, comprising: a protective cover in the form of a shell which surrounds a one-piece, seamless and vacuumed-formed insulation member. The insulation member includes an exterior portion and an interior portion, wherein the interior portion includes a plurality of curved surface defining a fuel incubator. The insulation member further comprises an extension for extending into a heat accumulator of the asphalt recycling apparatus.

These and other features, objects and advantages of the present invention will become apparent upon reading the following description thereof together with reference to the accompanying drawings.

BRIEF DESCRIPTION OF THE DRAWINGS

FIG. 6 is an exploded perspective view of an asphalt recycler and heat management apparatus;

FIG. 6A is a fragmentary, perspective view of an inside wall of a hopper assembly;

FIG. 7 is an exploded perspective view of an asphalt recycler and heat management apparatus; and FIG. 7A is a fragmentary, perspective view of an inside wall of a hopper assembly.

DETAILED DESCRIPTION OF THE PREFERRED EMBODIMENT

Figure 1:
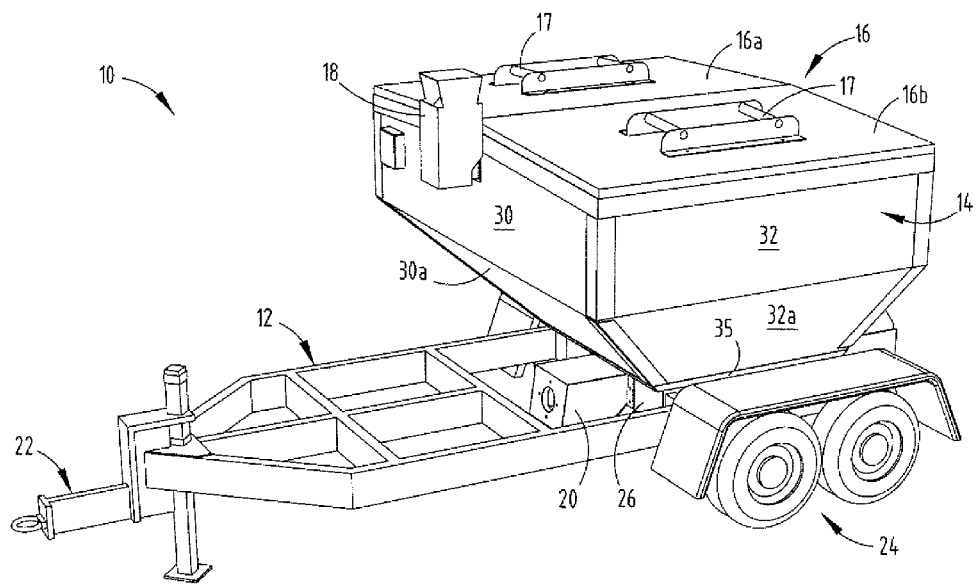
FIG. 1 is a perspective view of an asphalt recycler and heat management apparatus.

For the purposes of description herein, the terms "upper," "lower," "right," "left," "rear," "front," "vertical," "horizontal," and derivatives thereof shall relate to the invention as oriented in FIG. 1. However, it is to be understood that the invention may assume various alternative orientations, except where expressly specified to the contrary. It is also to be understood that the specific devices and processes illustrated in the attached drawings, and described in following specification, are simply exemplary embodiments. Hence, specific dimensions and other physical characteristics relating to the embodiments disclosed herein are not to be construed as limiting, unless expressly stated otherwise.

Figure 5:
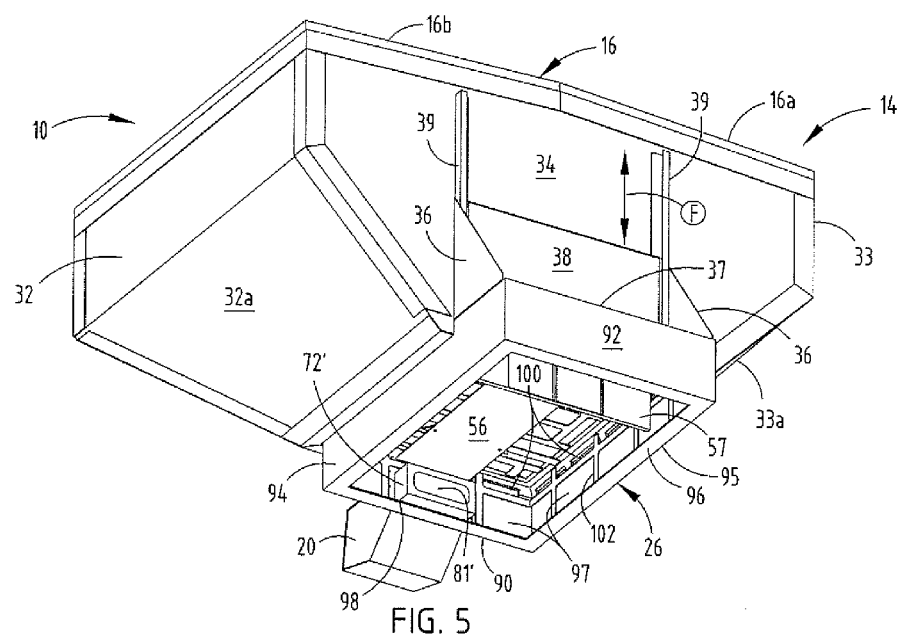
FIG. 5 is a bottom perspective view of an asphalt recycler and heat management apparatus.

As shown in FIG. 1, the reference numeral 10 generally designates an asphalt recycler and asphalt heat management unit which, in this embodiment, is shown as a trailer mounted unit having a trailer 12 and a hopper 14. The present invention is also contemplated to be an asphalt recycler, hauler and asphalt heat management unit that can be mounted to a vehicle chassis, inserted in a slip-in configuration on a dump truck, or other like configuration that allows the apparatus to be moved to a job-site. The hopper 14 includes a set of access doors 16 comprised of access doors 16a and 16b for loading asphalt. The access doors 16a and 16b further comprise handles guides 17 for attaching handles to the access doors 16a and 16b and the access doors 16a and 16b are generally hinged at their outer edges for allowing access to the inside of the hopper 14. The access doors 16a and 16b are operable between open and closed positions, and are shown in FIG. 1 in the closed position. The hopper further includes a chimney assembly 18 for venting the hopper 14. The hopper generally includes a front wall 30 and side walls 32 and 33 (FIG. 5). The front wall 30 includes an angled portion 30a and side walls 32, 33, which are substantially symmetrical, also include angled portions 32a, 33a, which generally direct asphalt to the bottom wall 35 of the hopper 14. As shown in FIG. 1, the trailer 12 comprises a set of wheels 24 and a vehicle mounting apparatus 22 for mounting the trailer 12 to a vehicle to carry the unit 10 to an asphalt repair job site. As shown in FIG. 1, the unit 10 further comprises a combustion chamber 20 which is coupled to a heat accumulator 26 for heating the contents of the hopper 14 as further described below.

Figure 2:
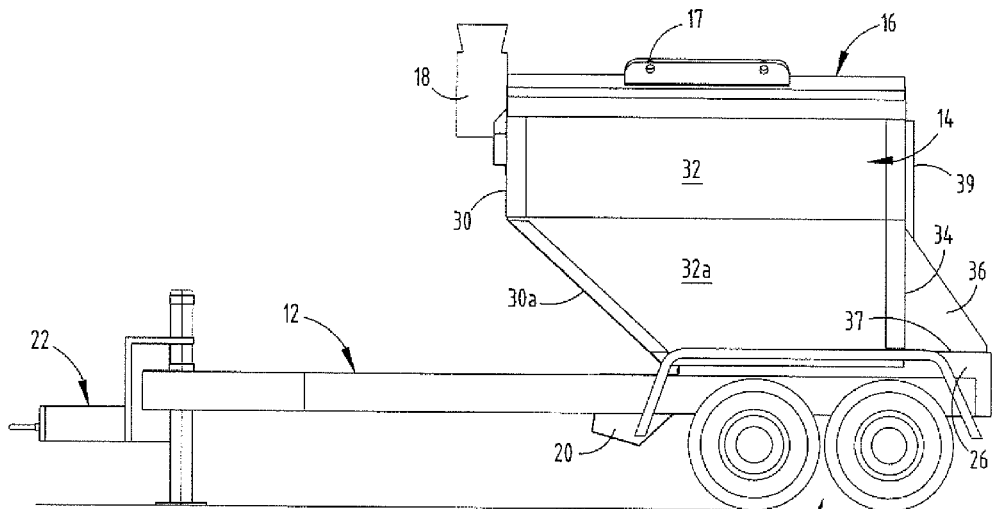
FIG. 2 is a side elevational view of the embodiment shown in FIG. 1.
Figure 2A:
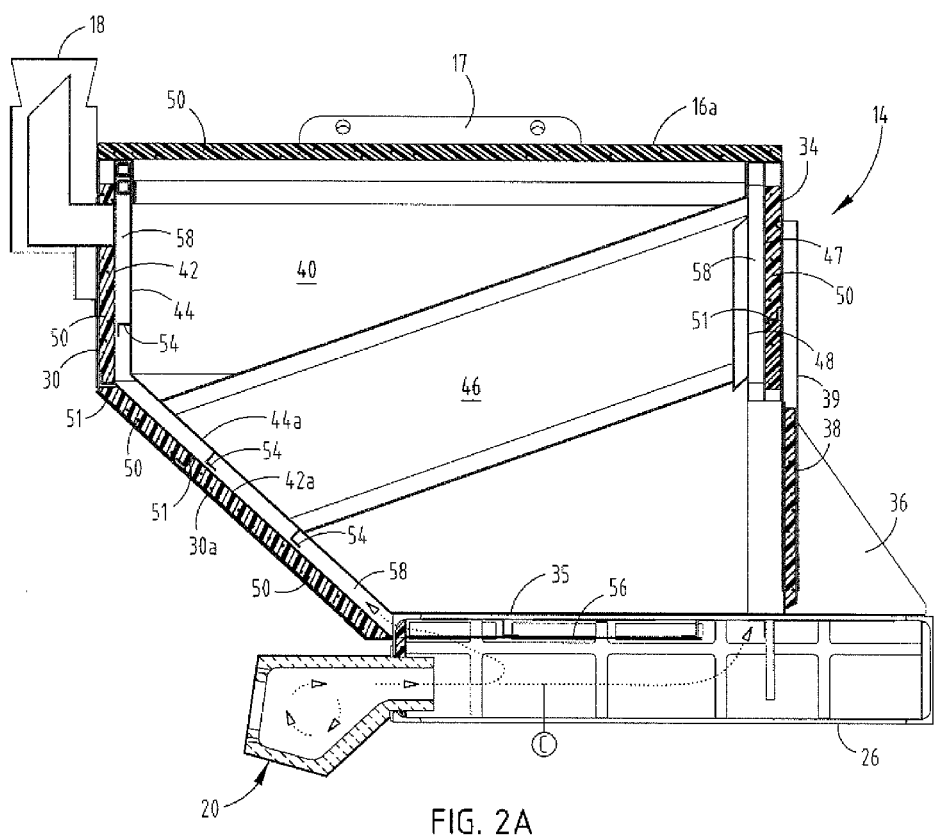
FIG. 2A is a cross-sectional view of an asphalt recycler and heat management apparatus.

Referring now to FIG. 2, the hopper 14 further comprises a rear wall 34 upon which a metering door 38, see FIG. 2A, is disposed between a pair of metering door guides 39, best shown in FIG. 5. In operation, the metering door 38 moves vertically up and down to allow controlled access to the inside of hopper 14, such that asphalt can be retrieved in an asphalt retrieval area 37 disposed above the heat accumulator 26 adjacent rear wall 34 of hopper 14. The asphalt retrieval area or the landing 37 is flanked on either side by guards 36, which help contain the asphalt as it exits hopper 14.

As shown in FIG. 2A, the hopper 14 comprises a cavity 40, which is shown in FIG. 2A as an upwardly opening inner enclosure surrounded by a series of wall systems. The cavity or enclosure 40 holds an asphalt mixture (a hot mixture or cold mix), or asphalt to be recycled, for processing. The present invention is designed to perform several different functions with respect to different types of asphalt. For example, the cavity 40 of the hopper assembly 14 can be used to haul asphalt to a jobsite. It can also recycle asphalt pieces or millings to prepare a batch of hot mix asphalt. Hot mix asphalt concrete (HMAC) is produced at about 300° F. This high temperature serves to decrease viscosity and moisture during the manufacturing process, resulting in a very durable material. HMAC is most commonly used for high-traffic areas, such as busy highways and airports. Warm mix asphalt concrete (WAM or WMA) reduces the temperature required for manufacture by adding asphalt emulsions, waxes, or zeolites. Cold mix asphalt concrete, commonly referred to as cold mix, is generally asphalt emulsified in soapy water before mixing it with an aggregate, thereby eliminating the need for high temperatures altogether. However, the asphalt produced is not nearly as durable as HMAC or WAM, and cold mix asphalt is typically used for low traffic areas or to patch damaged HMAC. The present invention can be used for all types of asphalt mix by recycling used asphalt, heating a hot or warm asphalt mixture to a desired working temperature (200° F.-300° F.) as well as maintain a cold mix which also needs to be heated to approximately 100° F. in order to be applied to a repair site.

In the embodiment shown in FIG. 2, the hopper 14 comprises a series of walls which includes an outer wall system, a middle wall system, and an inner wall system. As shown in FIG. 2A, the outer wall comprises front wall 30 and angled front wall portion 30a. Rear wall 34 is also part of the outer wall system of the hopper 14. Middle wall 42 is disposed between front wall 30 and inner wall 44. Both the middle wall 42 and inner wall 44 also have angled portions identified as 42a and 44a. Middle wall 47 is disposed between outer wall 34 and inner wall 48 and the rear portion of the hopper 14. A similar configuration is found on the side walls 32, 33 and in the angled portions of the side walls 32a, 33a with regards to an outer wall, middle wall, and inner wall. Thus, the hopper side walls, front wall, and rear wall have a spaced plating configuration consisting of an outer wall system, a middle wall system, and inner wall system. Spaces are defined between the outer wall system and the middle wall system to provide insulated chambers as further described below. Spaces are also defined between the inner wall system and the middle wall system which define heated chambers as further described below.

The hopper 14 is fully insulated about the outer walls of the enclosure. Specifically, in the embodiment shown in FIG. 2A, insulation 50 is disposed within insulated chambers disposed within a space between a middle wall system and an outer wall system of the hopper 14 as described below. With respect to the front wall, as shown in FIG. 2A, the insulation 50 is held in place by insulation brackets or rails 51. The insulation 50 is disposed between the outer front wall 30 and middle front wall 42 as well as between the angled portions of the front wall 30a and 42a. Because of the spaced plating configuration of the outer wall, middle wall, and inner wall systems of the hopper 14, the insulation is held in place by the insulation rails 51 and helps to minimize heat loss from the interior cavity 40 of the hopper 14 during operation. Insulation is also found in the access doors 16a, 16b, rear wall 34, and bottom wall 35 in a similar plating configuration as the insulation 50 described with respect to the front wall 30, 30a. Thus, the entirety of the hopper 14 is insulated about the outer wall system with insulation disposed directly adjacent the outer wall system, as well as within the access doors 16 and metering door 38, and adjacent the bottom wall 35, which is further described below.

As shown in FIG. 2A, an angled lengthwise air duct 46 is shown which, in this embodiment, extends from the angled portion of front inner wall 44a to the inner wall 48 of the rear of the hopper 14. In this way, the air duct 46 extends across the interior cavity 40 of the hopper 14 and interconnects the front portion of the hopper with the rear portion of the hopper, such that heated air is circulated from the front to the rear of the hopper, thereby providing more uniform heat distribution.

In the spaced plating arrangement between the series of walls of the hopper 14, specifically between the middle wall system and the inner wall system of the hopper assembly 14, a heat distribution system is disposed in the form of baffles 54, which make up a baffling system to control heat distribution as further described below. In the embodiment shown in FIG. 2A, baffles 54 are shown disposed between the inner wall and middle wall, such as inner wall 44, 44a and 42, 42a. The baffles 54 of the baffling system are designed to prevent overheating of specific areas within the interior cavity 40 of hopper 14 and, therefore, provide evenly distributed heat to the interior cavity 40 of the hopper 14. Heat is generated by the combustion chamber 20, as further described below, and flows along a path as indicated by arrows C. As heated air exits the combustion chamber 20, it enters the heat accumulator or burner box 26 and is then deflected by a deflector plate 56 and is then directed to heat chambers or heated air passages 58 disposed within a space between the inner wall system and middle wall system of the hopper 14. As shown in FIG. 2A, the heated airflow passages or sections 58 are disposed between the front middle wall 42 and the front inner wall 44, for example, and heated airflow sections 58 are also disposed between the side walls 32, 33 in a similar manner. Air vents (not shown) are disposed on the front inner wall 44 and rear inner wall 48, which connect front and rear heated airflow sections 58 via air duct 46. The deflector plate 56 deflects heat from being directly applied to the insulated bottom wall 35 of the hopper 14 to the heated airflow sections 58 disposed about the front, rear, and side walls of the hopper 14 through the vents. In this way, the heat distribution system is in communication with the heat accumulator 26 and the hopper 14 as heat is produced from the combustion chamber 20. This communication is realized thought the vents of the heat accumulator, described below, venting heat to the heat chambers 58 of the hopper 14. It is further contemplated that the heat chambers 58 can be replaced with sealed sections that contain oil in the form of an oil jacket which is heated by the system for providing consistent and uniform heat to the hopper assembly 14 in operation. Such an oil jacket would generally be disposed in sealed sections located between the middle and inner walls of hopper 14.

Figure 3:
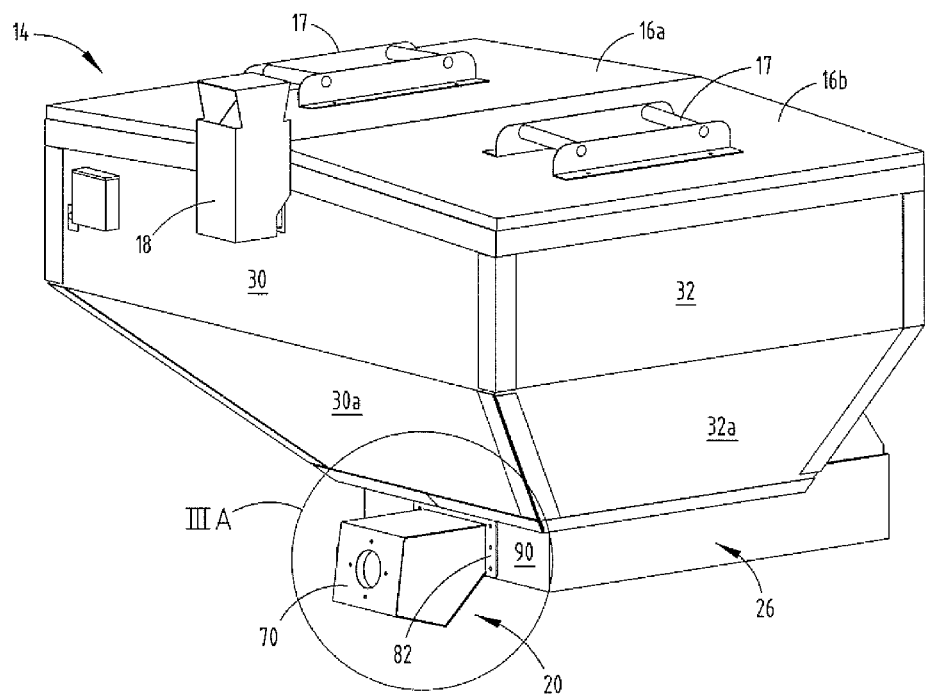
FIG. 3 is a perspective view of an asphalt hopper and combustion chamber.
Figure 3A:
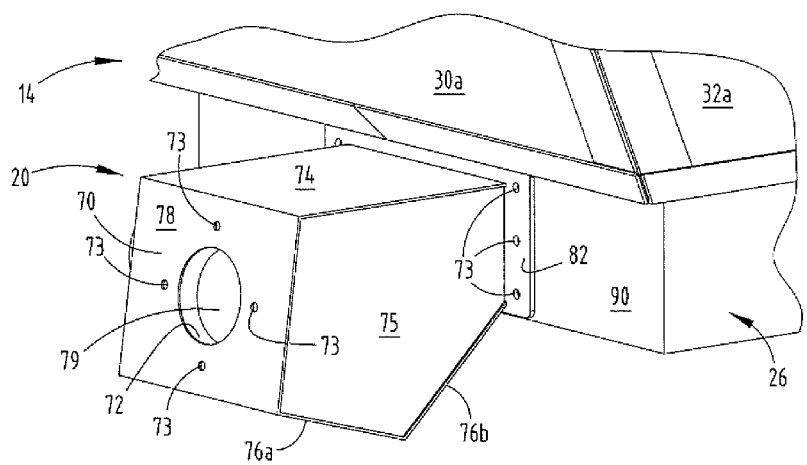
FIG. 3A is a perspective view of a combustion chamber.

Turning to FIG. 3A, the hopper 14 is shown disposed above a burner box or heat accumulator 26, wherein the burner box 26 further has a combustion chamber 20 to which it is operably coupled. The combustion chamber 20 comprises an exterior metal shell 70 which has a plate 82 attached thereto configured to connect the combustion chamber 20 to the heat accumulator or burner box 26, as further described below. As shown in more detail in FIG. 3A, the combustion chamber 20 has a metal exterior shell 70 comprised of a top wall 74, side walls 75, a rear wall 78, and angled bottom wall portions 76a and 76b. A portion of the combustion chamber 20 is disposed within the heat accumulator 26 in assembly as further described below. The rear wall 78 of the combustion chamber 20 has an aperture 79 through which the combustion chamber 20 communicates with a burner (not shown). The burner, referred to hereinafter as a diesel burner, is connected to the rear wall 78 of the combustion chamber 20 using apertures 73 which are configured to engage fasteners (not shown). The present invention can also be used in conjunction with other burners known in the art such as a propane burner or compressed natural gas burner. However, for purposes of this disclosure, the burner will be referred to as a diesel burner throughout this disclosure. Plate 82 of the exterior metal shell 70 of the combustion chamber 20 comprises apertures 73 which are configured to engaged the fasteners (not shown) to connect the combustion chamber 20 to the heat accumulator 26 on a front wall 90 of the heat accumulator 26. As shown in FIG. 3A and described in more detail in FIGS. 4 and 4A-4C, the combustion chamber 20 has an exterior metal shell 70 which surrounds a vacuum-formed one-piece ceramic insulation member 72, which insulates the combustion chamber 20 and maximizes the combustion efficiency of the combustion chamber 20 in delivering heat to the heat accumulator 26.

Figure 4:
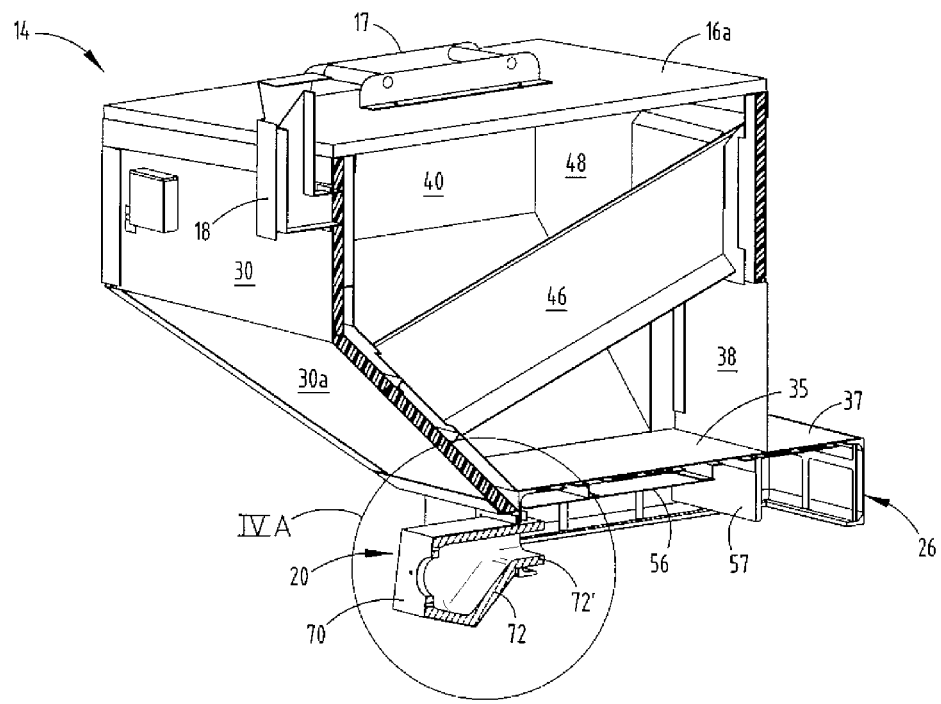
FIG. 4 is a cross-sectional perspective view of an asphalt recycler and heat management apparatus.
Figure 4A:
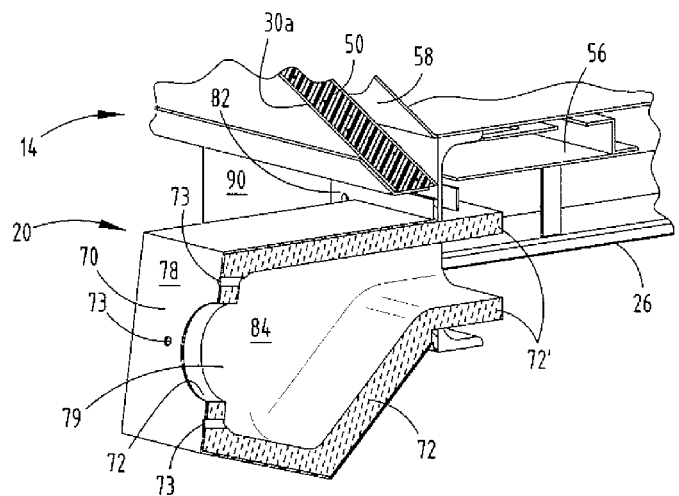
FIG. 4A is a cross-sectional perspective view of a combustion chamber.

As shown in FIGS. 4 and 4A, a cross section of the assembly shown in FIG. 3 is depicted. In FIGS. 4 and 4A, a front portion extension 72' of the insulation member 72 is shown disposed within the heat accumulator 26. As shown in FIG. 4, the heat accumulator 26 extends under the asphalt retrieval or landing area 37, such that the heat accumulator 26 will keep asphalt disposed on the landing 37 heated for asphalt repair application. A deflector plate 57 disposed within the heat accumulator 26 ensures that asphalt disposed in the landing 37 is not super heated and also directs heat into the interior cavity 40 of the hopper 14 through heated air passageways 58. As further shown in FIG. 4A, the combustion chamber 20 comprises an interior cavity 84 which is made up of curved surfaces that are smooth and seamless as further described in the description of FIG. 4B.

Figure 4B:
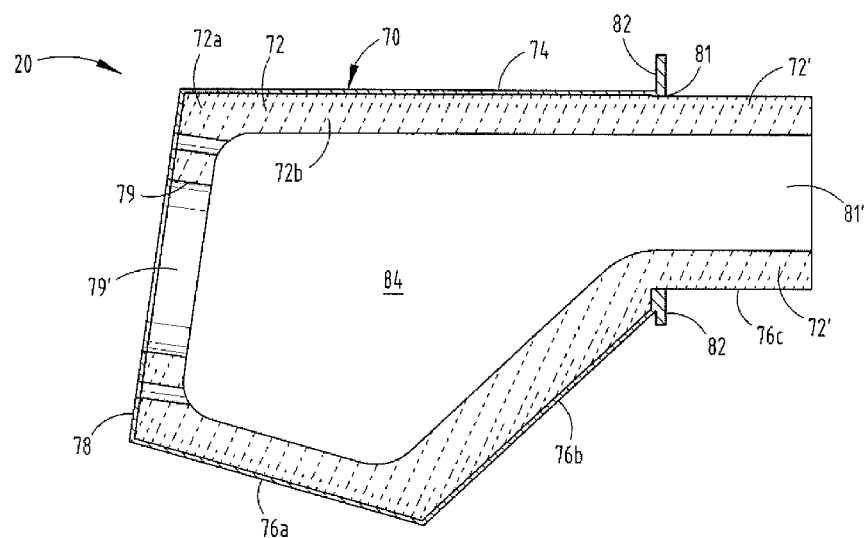
FIG. 4B is a side cross-sectional view of a combustion chamber.

Turning now to FIG. 4B, a combustion chamber 20 of the present invention is depicted having a protective covering in the form of a metal shell 70, which comprises a top wall 74, a rear wall 78 having an aperture 79 disposed thereon, bottom wall sections 76a, 76b, and 76c, as well as a front wall 82 in the form of a connecting flange or plate. The rear wall 78 acts as a diesel burner flange for connecting the combustion chamber 20 to a diesel burner in assembly. The front wall 82 acts as a connector plate for connecting the combustion chamber 20 to the front wall 90 of the heat accumulator 26 in a configuration as shown in FIG. 4A. Contained within the metal shell 70 of the combustion chamber 20 is a vacuum-formed one-piece seamless ceramic insulation member 72 that is capable of withstanding temperatures of 2300° F. The one-piece seamless design of the insulation member 72 extends from the rear wall 78 of the combustion chamber to the front wall 82, then extends further into the heat accumulator (not shown) approximately 3 inches by insulation member extension 72'.

Combustion chambers known in the art are often times fabricated by using multiple pieces of insulation which are seamed together using a high temperature sealant such as a caulk and other like adhesives to hold the insulated form. The multi-piece configuration of these known combustion chambers leads to failure at the seams as heat will breakdown the high temperature in operation. Thus, such combustion chambers are not designed to withstand the extreme heat required to recycle asphalt, which can reach levels of 2300° F. in the combustion chamber in order to get the asphalt millings to a temperature of 300° F. The one-piece seamless design of the insulation member 72 of the combustion chamber 20 of the present invention protects against front wall burnout, which happens when an excessive amount of heat is conducted through the seams of a combustion chamber and radiates to the lower portion of a front hopper wall, causing structural damage to the steel of the hopper. When using the present invention, in a configuration such as that shown in FIG. 4, the combustion chamber 20 will not conduct heat to the angled portion of the front wall 30a in sufficient levels so as to cause damage to the steel of the front wall 30a of the hopper 14. In this way, the seamless combustion chamber of the present invention is capable of withstanding temperatures of up to 2300° F. for recycling asphalt without causing heat leaks at seams which can severely damage the steel of the front wall of a hopper. The insulation properties of the combustion chamber 20 as well as the insulation extension portion 72' further add to the front wall burnout prevention measures of the present invention as described below.

The insulation member 72 of the combustion chamber 20 is a vacuum-formed, one-piece seamless insulation member, which can be formed in a female mold and has a dense exterior portion 72a as compared to a less dense interior portion 72b. The less dense interior portion 72b has a greater ability to retain heat and, therefore retains the heat emanating from the cavity portion 84 of the combustion chamber 20, such that the exterior portion 72a of the insulation member 72 does not get as heated. Reduced heat in the higher density exterior portion 72a of the insulation member 72 results in minimal heat conducted to the metal shell 70 of the combustion chamber 20 which, in operation, minimizes the heat transferred to the metal shell 70. With such minimal heat being transferred to the metal shell 70 of the combustion chamber 20, the front wall, such as the angled front wall portion 30a of FIG. 4, is protected from excessive heat which can cause damage.

The exterior portion 72a of the insulation member 72 is generally harder than the less dense interior portion 72b. For example, the exterior portion 72a of the insulation member 72 may exhibit a density, for example, of 19 pounds per cubic foot (pcf) as compared to a density of 13 pcf found in the less dense interior portion 72b of the insulation member 72. In this way, the insulation member 72 has multiple densities which, in the embodiment shown in FIG. 4B, is realized in a dual density configuration with a less dense portion 72b and a more dense portion 72a. The insulation member 72 generally follows the contours of the metal shell 70 and has an aperture 79' disposed near aperture 79 of the metal shell 70 for connecting with a diesel burner. The insulation member 72 further comprises an aperture 81' disposed on the front end of the combustion chamber 20 adjacent the insulation member extension portion 72' which opens into the heat accumulator in assembly.

Other combustion chambers known in the art are configured using multiple pieces of insulated material which is seamed together with high temperature sealants such as caulk or other like adhesives. As explained above, these configurations create seams which fail under the intense heat required to recycle asphalt. Further, combustion chambers made from multiple sections of a single insulated material do not have a multi-density configuration and, therefore, exhibit a common density throughout. The common and uniform density of these known combustion chambers means that the heat created in the combustion chamber is radiated from an interior side to an exterior side without a lower density interior portion retaining high levels of heat and a higher density exterior portion insulating the protective shell from excessive heat. The intense heat radiated from the combustion chamber through the multi-piece seamed insulation to the metal shell of the combustion chamber creates not only an unsafe heat transfer to the hopper, but also a front wall burnout effect which leads to costly repairs and continued maintenance on the hopper assembly. Further, multi-piece insulation systems are comparatively inefficient due to heat loss at the seams in operation which is not realized with the seamless insulation member of the present invention.

Figure 4C:
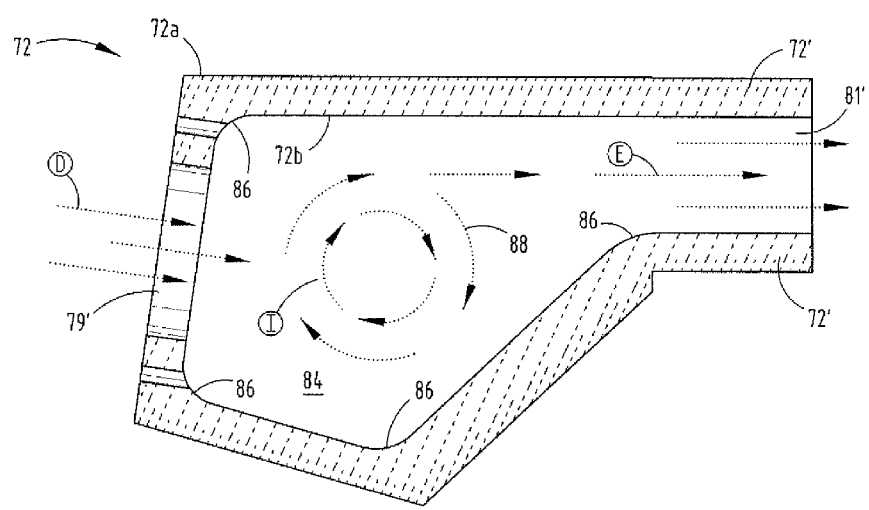
FIG. 4C is a side cross-sectional view of a combustion chamber.

Referring now to FIG. 4C, an insulation member 72 of a combustion chamber is shown wherein the insulation member 72 has an exterior high density portion 72a and an interior low density portion 72b, thereby creating a configuration having multiple densities, which in this embodiment is a dual density configuration for the insulation member 72. A retention head (not shown) mixes air and atomized diesel fuel through a nozzle which circulates the air and fuel, creating a mixture which is ignited by an igniter (not shown) near aperture 79' of the insulation member 72. The ignited air and fuel mixture enters into the insulation member 72 of the combustion chamber through aperture 79' in a direction as indicated by arrow D. As shown in FIG. 4C, the interior portion 72b of the insulation member 72 has curved or rounded edges 86 which create a tumbling effect of the ignited air and fuel mixture, such that the curved surfaces 86 within the seamless configuration of the insulation member 72 define a fuel incubator 88 within the cavity 84 of the insulation member 72. The curved surfaces 86 of the insulation member 72 create a tumbling effect of the air and fuel mixture, as indicated by arrows I. The fuel incubator 88 incubates the fuel and, therefore, retains, ignites and incubates the fuel within the cavity 84 of the insulation member 72. In this way, a higher ratio of fuel is combusted and more efficiently consumed in the incubation process as compared to a straight shot of fuel into the insulation member 72. Systems without an incubator causing a tumbling effect are less efficient and cannot consume all the fuel injected into a combustion chamber. This fuel ends up un-combusted on the system components or even on the asphalt mix itself.

The insulation member 72 of the present invention has smooth and seamless transitions in the form of the curved surfaces 86 disposed between all planar portions of the cavity or chamber 84 of the insulation member 72. The smooth seamless surface of the less dense portion 72b of the insulation member 72 facilitates an unencumbered flow of combustion within the cavity 84, and the curved surfaces 86 contribute to the circulation of the air and fuel in the fuel incubator 88, as indicated by arrows I, such that there is reduced thermal loading in any one particular area of the combustion chamber 20. By incubating the fuel, the fuel incubator 88 consumes fuel more efficiently and provides extremely high heat, all while producing low emissions. While the surface of the less dense portion 72b of the insulation member 72 may reach temperatures of approximately 2000° to 2300° F., the metal shell 70, as shown in FIG. 4B, is protected from this high heat by the higher density portion 72a of the insulation member 72, such that the heat radiated to the outer shell 70 is minimized. Heat generated within the cavity 84 of the insulation member 72 exits the insulation member 72 at aperture 81' disposed at the end of extension portion 72' in the direction indicated by arrow E. Multi-piece combustion chambers that are seamed together do not have the smooth surfaces of the present invention and therefore cause disruptions in the air flow such that an incubation effect is not achieved.

Referring now to FIG. 5, an asphalt recycling unit 10 is shown as removed from a trailer apparatus and generally comprises a hopper assembly 14, a heat accumulator or burner box 26, and a combustion chamber 20. The hopper 14 includes outer side walls 32, 33, which have angled portions 32a, 33a, a rear wall 34, and a front wall 30 (not shown). The hopper 14 includes a set of access doors 16 comprising left and right access doors 16b and 16a. The rear wall 34 comprises a metering door 38 which has metering door guides or rails 39, which guide the metering door vertically in a direction as indicated by arrow F. In operation, the metering door 38 is operable between open and closed positions, shown in the closed position in FIG. 5, such that the metering door can be opened vertically to a select height for accessing asphalt disposed within the hopper assembly 14. Further, hopper assembly 14 can be tilted at an angle to urge the asphalt mixture processed therein toward the metering door 38 for dispensing the asphalt mixture onto the asphalt mixture retrieval area or landing 37. This tilting effect can be caused by a hydraulic system incorporated into the hopper assembly 14, or the asphalt recycling unit 10 can be mounted on a dump truck bed wherein the truck supplies the apparatus for tilting the hopper 14.

Figure 5A:
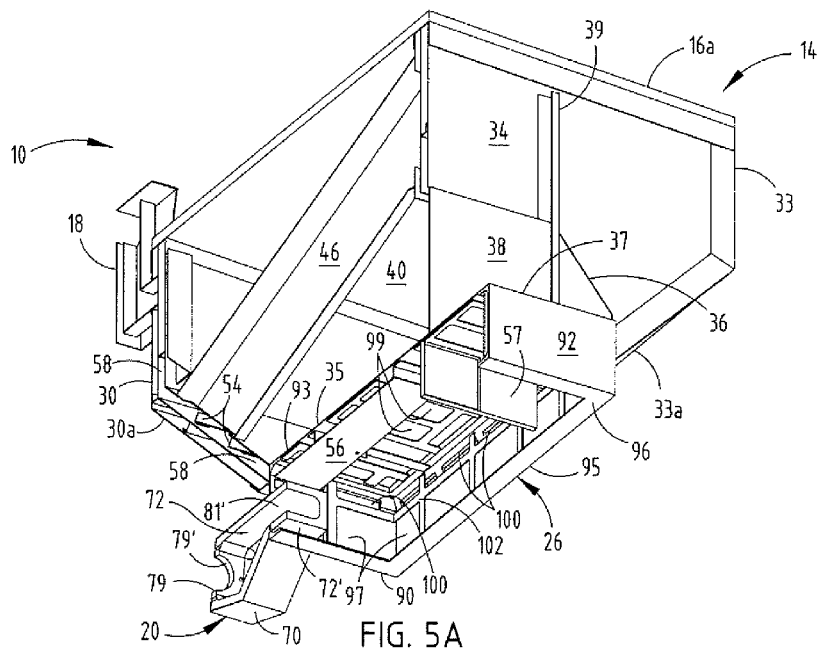
FIG. 5A is a bottom perspective cross-sectional view of an asphalt recycler and heat management apparatus.

As shown in FIGS. 5 and 5A, the combustion chamber 20 is operably coupled to the heat accumulator 26. The insulation member 72 of combustion chamber 20 includes an extension portion 72' which is disposed within the heat accumulator 26. The extension 72' of the insulation member 72 extends into the heat accumulator 26 such that the heat accumulator burner flange 82 remains insulated from the heat of the combustion chamber 20 as shown in FIG. 3A. In this way, the angled portion of the front wall 30a of the hopper assembly 14 also remains insulated from heat exiting the combustion chamber 20 such that a minimal amount of heat radiates to the front wall 30a in operation. Surprisingly, the extension portion 72' of the insulation member 72 need only extend into the heat accumulator 26 approximately 3 to 4 inches to effectively deter heat transfer to the front wall 32a of the hopper 14. By releasing the extreme heat generated in the combustion chamber 20 approximately 3 to 4 inches away from the front wall flange 82 into the heat accumulator 26, the extension 72' of the combustion chamber helps prevent against front wall burnout and surprisingly increases the efficiency heat production to the hopper 14.

As shown in FIGS. 5 and 5A, the heat accumulator 26 comprises a box-type configuration having a rear wall 92, a front wall 90, side walls 94, 95, and a bottom lip or rim 96. In full assembly, the bottom rim 96 supports an insulated pan (not shown) which closes off the heat accumulator during operation. The heat accumulator 26 further comprises a top wall 93, which also forms the bottom wall 35 of the hopper 14. The heat accumulator 26 is fully insulated about the side walls 94, 95 and front and rear walls 90, 92 by insulation panels 97, as well as on the top wall by insulation panels 99. The insulation panels 97, 99 disposed on the top wall, side walls, bottom pan, and front and rear walls create an insulation blanket which allows for more heat to be held in the heat accumulator 26 which translates into controlled movement of large amounts of heat into the heat airflow sections 58 of the apparatus. The heat accumulator 26 includes a cage-like support structure 102 which surrounds the top wall 93, side walls 94, 95, and front and rear walls 90, 92, such that the insulation panels 97 are disposed between the cage-support structure 102 and the walls of the heat accumulator 26. The bottom pan (not shown) which rests on the bottom rim 96 of the heat accumulator 26 is also insulated, such that the heat accumulator 26 is insulated on all sides. The heat accumulator 26 further comprises vents 100, which vent heat accumulated therein to the heated airflow sections 58 of the hopper assembly 14. Horizontal heat deflector plate 56 deflects heat to the front wall, rear wall and side walls of the hopper assembly 14 in operation, and vertical heat deflector plate 57 controls the amount of heat sent to the asphalt retrieval landing 37. Insulation panels 99 also insulate the hopper 14 adjacent the bottom wall 35.

As shown in FIGS. 6 and 7, a hopper assembly 108 is depicted in an exploded view wherein the hopper assembly 108 is similar to the hopper assembly 14 described in FIGS. 1-5. The hopper assembly 108, shown in FIGS. 6 and 7, comprises a series of spaced-apart plating shells or wall systems which include an inner wall system 110, a middle wall system 114, and an outer wall system 118. The inner wall system 110 comprises a baffling system having baffles 112 disposed within heated airflow sections 158. The heated airflow sections 158 are defined by the space between the inner wall system 110 and the middle wall system 114 in assembly. The middle wall system 114 comprises insulation rails 116 which support insulation panels that insulate the hopper assembly 108 in insulated chambers 150, which are formed between the outer wall system 118 and the middle wall system 114. In assembly, the hopper 108 is operably coupled to a heat accumulator 126, which has an aperture 124 disposed on the front wall of the heat accumulator 126 for coupling the heat accumulator 126 to a combustion chamber 120. The combustion chamber 120 further includes an extension 122 comprised of insulated material which extends into aperture 124 of the heat accumulator 126, such that heat is released from the combustion chamber 120 into the heat accumulator 126 in a manner that insulates the outer wall system 118 of the hopper 108 from excessive heat accumulation. The heat accumulator 126 further comprises vents 130 which direct heat from the combustion chamber 120 into the heated airflow sections 158 of the hopper assembly 108.

As shown in FIGS. 6A and 7A, a baffle system comprised of baffle members 112 is disposed in the heated airflow sections 158 defined by space between the inner wall system 110 and middle wall system 114 (not shown) for evenly distributing heat to the hopper assembly. Air heated within the heated airflow sections 158 rises through gas passages 113 disposed within the baffles 112. In this way, the heated air is evenly distributed throughout the heated airflow sections 158, such that, in operation, the baffles 112 slow the heat movement and control the heat distribution within the heated airflow sections 158. The result is an evenly distributed heating system for the hopper assembly, such that localized overheating of asphalt material contained within the hopper is avoided.

In a recycling operation, pieces of previously cured asphalt can be loaded into the volume of the cavity portion 40 of the hopper 14 of the present invention, as shown in FIG. 4. A diesel burner (not shown) is then initiated to feed a fuel and air mixture to the combustion chamber 20 where the mixture is ignited. The fuel and air mixture incubates in the fuel incubator 88 (FIG. 4C) of the combustion chamber 20 and heat produced from the combustion chamber 20 is expelled into the heat accumulator 26 where it is then deflected by the deflection plates 56, 57 to the heated air passages 58 of the hopper assembly 14. The heated air moves in a controlled uniform manner through the baffles 54 (FIG. 2A) of the baffling system disposed within the heated air passages 58 of the hopper assembly 14 to heat the asphalt pieces in a controlled manner such that localized overheating of the asphalt materials is prevented in any one area. The time it takes to recycle a load of asphalt depends on the age of the material, density of the material and the ambient air temperature. The typical asphalt recycling procedure is to load the hopper at the end of the workday, add rejuvenator as necessary, set the timer on the burner to start the burner at a predetermined time during the night, and when operators arrive for work the next morning a load of hot mix asphalt should be ready for use.

It will become apparent to those skilled in the art that various modifications to the preferred embodiment of the invention as described herein can be made without departing from the spirit or scope of the invention as defined by the appended claims.

The invention claimed is:

1. A portable asphalt recycling and asphalt heat management apparatus comprising:
    a combustion chamber having an insulation member that is a seamless, vacuum-formed, one-piece insulation member that defines a fuel incubator disposed therein;
    a heat accumulator operably coupled to the combustion chamber;
    a hopper assembly operably coupled to the heat accumulator; and
    a heat distribution system in communication with the heat accumulator and the hopper assembly.

2. The portable asphalt recycling and asphalt heat management apparatus of claim 1, wherein the hopper assembly further comprises:
    a series of wall systems disposed in a spaced-apart relationship including an inner wall system, a middle wall system and an outer wall system;
    heat chambers disposed within a space between the inner wall system and middle wall system; and
    insulated chambers disposed within a space between the middle wall system and the outer wall system.

3. The portable asphalt recycling and asphalt heat management apparatus of claim 2, wherein the heat distribution system further comprises:
    at least one heat deflector, and
    a control system for controlling heat movement.

4. The portable asphalt recycling and asphalt heat management apparatus of claim 3, wherein the control system is disposed within the heating chambers.

5. The portable asphalt recycling and asphalt heat management apparatus of claim 4, wherein the control system comprises a sealed oil jacket.

6. The portable asphalt recycling and asphalt heat management apparatus of claim 4, wherein the control system comprises a series of baffles.

7. The portable asphalt recycling and asphalt heat management apparatus of claim 1, wherein the insulation member further comprises an extension which extends into the heat accumulator.

8. The portable asphalt recycling and asphalt heat management apparatus of claim 7, wherein the insulation member is a ceramic chamber having planar portions with curved surfaces disposed between all planar portions of the chamber.

9. The portable asphalt recycling and asphalt heat management apparatus of claim 1, wherein the fuel incubator circulates, retains and warms fuel and air for decreased fuel consumption and increased combustion efficiency.

10. The portable asphalt recycling and asphalt heat management apparatus of claim 8, wherein the insulation member has an exterior portion and an interior portion, the interior portion having a first density and the exterior portion having a second density, wherein the second density is higher than the first density creating a dual density configuration of the insulation member.

11. A portable asphalt recycling and asphalt heat management apparatus comprising:
- a combustion chamber having a fuel incubator, wherein the combustion chamber radiates heat;
- an insulated and vented heat accumulator operably coupled to the combustion chamber to collect heat that radiates from the combustion chamber;
- an insulated hopper assembly coupled to the heat accumulator; and
- a heat distribution system in communication with the heat accumulator and the hopper assembly.

12. The portable asphalt recycling and asphalt heat management apparatus of claim 11, wherein the combustion chamber comprises an insulation member in the form of a seamless vacuum-formed one-piece insulation member.

13. The portable asphalt recycling and asphalt heat management apparatus of claim 12, wherein the insulation member is a ceramic chamber having planar portions with curved surfaces disposed between all planar portions of the chamber.

14. The portable asphalt recycling and asphalt heat management apparatus of claim 13, wherein the insulation member further comprises an extension which extends into the heat accumulator.

15. The portable asphalt recycling and asphalt heat management apparatus of claim 11, wherein the hopper assembly further comprises:
- a series of wall systems disposed in a spaced-apart relationship including an inner wall system, a middle wall system and an outer wall system;
- heat chambers disposed within a space between the inner wall system and middle wall system; and
- insulated chambers disposed within a space between the middle wall system and the outer wall system.

16. The portable asphalt recycling and asphalt heat management apparatus of claim 15, wherein the heat distribution system further comprises:
- a heat deflector disposed in an upper portion of the heat accumulator, and
- a control system disposed within at least a portion of the heat chambers.

17. The portable asphalt recycling and asphalt heat management apparatus of claim 16, wherein the control system comprises a series of baffles.

18. The portable asphalt recycling and asphalt heat management apparatus of claim 16, wherein the control system comprises a sealed oil jacket.

* * * * *